(12) United States Patent
Lindoff et al.

(10) Patent No.: US 12,007,122 B2
(45) Date of Patent: Jun. 11, 2024

(54) REVERSIBLE HEAT PUMP ASSEMBLY AND DISTRICT THERMAL ENERGY DISTRIBUTION SYSTEM COMPRISING SUCH A REVERSIBLE HEAT PUMP ASSEMBLY

(71) Applicant: E.ON SVERIGE AB, Malmo (SE)

(72) Inventors: Bengt Lindoff, Bjarred (SE); Jacob Skogstrom, Lomma (SE); Per Rosen, Lund (SE)

(73) Assignee: E.ON SVERIGE AB, Malmo (SE)

( * ) Notice: Subject to any disclaimer, the term of this patent is extended or adjusted under 35 U.S.C. 154(b) by 599 days.

(21) Appl. No.: 17/056,396

(22) PCT Filed: May 14, 2019

(86) PCT No.: PCT/EP2019/062324
§ 371 (c)(1),
(2) Date: Nov. 17, 2020

(87) PCT Pub. No.: WO2019/219670
PCT Pub. Date: Nov. 21, 2019

(65) Prior Publication Data
US 2021/0364168 A1    Nov. 25, 2021

(30) Foreign Application Priority Data
May 17, 2018   (EP) ..................................... 18172779

(51) Int. Cl.
*F25D 11/02*       (2006.01)
*F24D 10/00*       (2022.01)
(Continued)

(52) U.S. Cl.
CPC ........ *F24D 10/003* (2013.01); *F24D 11/0214* (2013.01); *F25B 13/00* (2013.01); *F24D 2200/12* (2013.01)

(58) Field of Classification Search
CPC ............... F24D 10/003; F24D 11/0214; F24D 2200/12; F25B 13/00
See application file for complete search history.

(56) References Cited

U.S. PATENT DOCUMENTS

| | | | |
|---|---|---|---|
| 11,041,634 B2 * | 6/2021 | Rosén | ................. F24D 19/1006 |
| 2011/0289952 A1 * | 12/2011 | Kim | .................... F24D 19/1072 |
| | | | 62/189 |
| 2012/0279681 A1 * | 11/2012 | Vaughan | ................. F25B 30/06 |
| | | | 165/96 |

FOREIGN PATENT DOCUMENTS

| | | |
|---|---|---|
| CH | 671622 | 9/1989 |
| CN | 104501276 | 4/2015 |

(Continued)

OTHER PUBLICATIONS

Arashima, Heat Pump Type Hot-Water Heating Device, Jan. 19, 2012, JP2012013357A, Whole Document (Year: 2012).*

(Continued)

*Primary Examiner* — Larry L Furdge
(74) *Attorney, Agent, or Firm* — Knobbe, Martens, Olson & Bear, LLP

(57) ABSTRACT

A reversible heat pump assembly (100) is disclosed. The heat pump assembly (100) comprises a heat pump (110) having a first side (120) and a second side (130), the heat pump (110) being configured to transfer heat from the first side (120) to the second side (130) or vice versa; a first side inlet valve assembly (126) having a heat pump connection (126a) connected to the first side (120), and hot and cold conduit connections (126b; 126c) arranged to be connected to a thermal energy grid (10) comprising hot and cold conduits (12; 14); a second side outlet valve assembly (136) having a heat pump connection (136a) connected to the second side (130), and heating and cooling circuit connections (136b; 136c) arranged to be connected to heating and (Continued)

cooling circuits (130; 140), respectively. The reversible heat pump assembly (100) is configured to be selectively set in either a heating mode or a cooling mode. In the heating mode the heat pump (110) is configured to transfer heat from the first side (120) to the second side (130), the first side inlet valve assembly (126) is configured to fluidly connect the hot conduit connection (126*b*) and the heat pump connection (126*a*), and the second side outlet valve assembly (136) is configured to fluidly connect the heat pump connection (136*a*) and the heating circuit connection (136*b*). In the cooling mode the heat pump (110) is configured to transfer heat from the second side (130) to the first side (120), the first side inlet valve assembly (126) is configured to fluidly connect the cold conduit connection (126*c*) and the heat pump connection (126*a*), and the second side outlet valve assembly (136) is configured to fluidly connect the heat pump connection (136*a*) and the cooling circuit connection (136*c*). Also a district thermal energy distribution system comprising a plurality of reversible heat pump assemblies (100) is disclosed.

12 Claims, 2 Drawing Sheets

(51) Int. Cl.
  *F24D 11/02* (2006.01)
  *F25B 13/00* (2006.01)

(56) References Cited

FOREIGN PATENT DOCUMENTS

| EP | 0151493 | | 8/1985 |
|---|---|---|---|
| JP | 2012013357 | | 1/2012 |
| JP | 2012013357 A | * | 1/2012 |
| JP | 2014214978 | | 12/2016 |
| KR | 20120033330 | | 4/2012 |
| WO | WO 2010/145040 | | 12/2010 |

OTHER PUBLICATIONS

International Search Report and Written Opinion of PCT/EP2019/062324, dated Aug. 7, 2019, in 4 pages.

* cited by examiner

REVERSIBLE HEAT PUMP ASSEMBLY AND DISTRICT THERMAL ENERGY DISTRIBUTION SYSTEM COMPRISING SUCH A REVERSIBLE HEAT PUMP ASSEMBLY

FIELD OF THE INVENTION

The invention relates to a reversible heat pump assembly. The invention relates to a district thermal energy distribution system comprising such a reversible heat pump assembly.

BACKGROUND OF THE INVENTION

Nearly all large developed cities in the world have at least two types of energy grids incorporated in their infrastructures; one grid for providing electrical energy and one grid for providing space heating and hot tap water preparation. Today a common grid used for providing space heating and hot tap water preparation is a gas grid providing a burnable gas, typically a fossil fuel gas. The gas provided by the gas grid is locally burned for providing space heating and hot tap water. An alternative for the gas grid for providing space heating and hot tap water preparation is a district heating grid. Also the electrical energy of the electrical energy grid may be used for space heating and hot tap water preparation. Also the electrical energy of the electrical energy grid may be used for space cooling. The electrical energy of the electrical energy grid is further used for driving refrigerators and freezers.

Accordingly, traditional building heating and cooling systems use primary high grade energy sources such as electricity and fossil fuels or an energy source in the form of industrial waste heat to provide space heating and/or cooling, and to heat or cool water used in the building. Furthermore, it has been increasingly common to also install a district cooling grid in cities for space cooling. The process of heating or cooling the building spaces and water converts this high grade energy into low grade waste heat with high entropy which leaves the building and is returned to the environment.

Hence, there is a need for improvements in how to provide heating and cooling to a city.

SUMMARY OF THE INVENTION

It is an object of the present invention to solve at least some of the problems mentioned above.

According to a first aspect a reversible heat pump assembly is provided.

The reversible heat pump assembly comprises a heat pump having a first side and a second side, the first side having a first side inlet and a first side outlet allowing heat transfer liquid to flow through the first side of the heat pump, the second side having a second side inlet and a second side outlet allowing heat transfer liquid to flow through the second side of the heat pump.

The heat pump is configured to transfer heat from the first side to the second side or vice versa.

The reversible heat pump assembly further comprises a first side inlet valve assembly comprising:
 a heat pump connection to the first side inlet;
 a hot conduit connection arranged to be connected to a hot conduit of a thermal energy grid, the hot conduit being configured to allow heat transfer liquid of a first temperature to flow therethrough; and
 a cold conduit connection arranged to be connected to a cold conduit of the thermal energy grid, the cold conduit being configured to allow heat transfer liquid of a second temperature to flow therethrough, the second temperature being lower than the first temperature.

The reversible heat pump assembly further comprises a second side outlet valve assembly comprising:
 a heat pump connection to the second side outlet;
 a heating circuit connection arranged to be connected to a heating circuit being configured to allow heat transfer liquid to flow therethrough; and
 a cooling circuit connection arranged to be connected to a cooling circuit being configured to allow heat transfer liquid to flow therethrough.

The reversible heat pump assembly is configured to be selectively set in either a heating mode or a cooling mode.
 In the heating mode:
 the heat pump is configured to transfer heat from the first side to the second side;
 the first side inlet valve assembly is configured to fluidly connect the hot conduit connection and the heat pump connection; and
 the second side outlet valve assembly is configured to fluidly connect the heat pump connection and the heating circuit connection.
 In the cooling mode:
 the heat pump is configured to transfer heat from the second side to the first side;
 the first side inlet valve assembly is configured to fluidly connect the cold conduit connection and the heat pump connection; and
 the second side outlet valve assembly is configured to fluidly connect the heat pump connection and the cooling circuit connection.

The wording "selectively set in either a heating mode or a cooling mode" should be construed as the reversible heat pump assembly is at one point in time set in the heating mode and at another point in time set in the cooling mode.

The reversible heat pump assembly is simple to connect to the thermal energy circuit being part of a district thermal energy distribution system. The reversible heat pump assembly provide for the use of the same assembly for delivering both heating and cooling. At one point in time the reversible heat pump assembly may be set in the heating mode and at another point in time the reversible heat pump assembly may be set in the cooling mode. By the present reversible heat pump assembly, the utilization of the heat pump assembly may be increased as compared with a dedicated heating or cooling heat pump assembly. The construction of a heating/cooling system in a building may be simplified since only one single heat pump assembly is needed. Further, the controlling of a heating/cooling system in a building may be simplified since only one single heat pump assembly needs to be controlled. The present reversible heat pump assembly may further provide scalability, assume that a client at first only is interested in heating, at a later point in time the same client may start getting cooling delivered as well from the same heat pump assembly. Hence, no new heat pump assembly needs to be installed at the client.

Upon the reversible heat pump assembly is set in the heating mode, the first side inlet valve assembly may be configured to fluidly disconnect the cold conduit connection from the heat pump connection.

Upon the reversible heat pump assembly is set in the heating mode, the second side outlet valve assembly may be configured to fluidly disconnect the heat pump connection from the cooling circuit connection.

Upon the reversible heat pump assembly is set in the cooling mode, the first side inlet valve assembly may be configured to fluidly disconnect the hot conduit connection from the heat pump connection.

Upon the reversible heat pump assembly is set in the cooling mode, the second side outlet valve assembly may be configured to fluidly disconnect the heat pump connection from the heating circuit connection.

The heat pump may be a reversible heat pump comprising a first side coil, a second side coil and a reversing valve.

Upon the heat pump assembly is set in the heating mode, the first side coil may be configured to work as an evaporator, the second side coil may be configured to work as a condenser, and the reversing valve may be set such that refrigerant of the heat pump is flowing from the first side coil to the second side coil.

Upon the heat pump assembly is set in the cooling mode, the second side coil may be configured to work as an evaporator, the first side coil may be configured to work as a condenser, and the reversing valve may be set such that refrigerant of the heat pump is flowing from the second side coil to the first side coil.

The reversible heat pump assembly may further comprise a heat pump assembly mode controller configured to set the reversible heat pump assembly either in the heating mode or in the cooling mode.

The second side outlet valve assembly may further comprise a plurality of heating circuit connections each arranged to be connected to one of a plurality of heating circuits each heating circuit being configured to allow heat transfer liquid to flow therethrough. In the heating mode, the heat pump assembly mode controller may be configured to set the second side outlet valve assembly to fluidly connect the heat pump connection and one of the heating circuit connections, thereby to set which one of the plurality of heating circuits to be provided with heating from the heat pump assembly.

Each of the plurality of heating circuits may be a different type of heating circuit. Examples of heating circuits are a tap hot water heating circuit, a comfort heating circuit, a process heating circuit and a pool heating circuit. By being able to operate the different heating circuits one by one it is made possible to operate the heat pump optimally for each type of heating circuit.

The heat pump assembly mode controller may further be configured to set the second side outlet valve assembly to fluidly connect the heat pump connection and one of the heating circuit connections at a first point in time and to set the second side outlet valve assembly to fluidly connect the heat pump connection and another one of the heating circuit connections at a second point in time, the second point in time being different from the first point in time.

The heat pump assembly mode controller may be configured to receive demand signals from the plurality of heating circuits and a cooling circuit. The heat pump assembly mode controller may be configured to prioritize the demands differently.

The second side outlet valve assembly may comprise a plurality of cooling circuit connections each arranged to be connected to one of a plurality of cooling circuits each cooling circuit being configured to allow heat transfer liquid to flow therethrough. In the cooling mode, the heat pump assembly mode controller may be configured to set the second side outlet valve assembly to fluidly connect the heat pump connection and one of the cooling circuit connections, thereby to set which one of the plurality of cooling circuits to be provided with cooling from the heat pump assembly.

Each of the plurality of cooling circuits may be a different type of cooling circuit. Examples of cooling circuits are a comfort cooling system, a process cooling system, a refrigeration system, and a freezing system. By being able to operate the different cooling circuits one by one it is made possible to operate the heat pump optimally for each type of cooling circuit.

The heat pump assembly mode controller may be configured to set the second side outlet valve assembly to fluidly connect the heat pump connection and one of the cooling circuit connections at a first point in time and to set the second side outlet valve assembly to fluidly connect the heat pump connection and another one of the cooling circuit connections at a second point in time, the second point in time being different from the first point in time.

The heat pump assembly mode controller may be configured to receive demand signals from the plurality of cooling circuits and a heating circuit. The heat pump assembly mode controller may be configured to prioritize the demands differently.

The heat pump assembly mode controller may be configured to receive demand signals from the plurality of cooling circuits and/or the plurality of heating circuits. The heat pump assembly mode controller may be configured to prioritize the demands differently.

The reversible heat pump assembly may further comprise:
  a pressure difference determining device adapted to determine a local pressure difference between heat transfer liquid of the hot and the cold conduits;
  a flow controller connected in between the first side inlet of the heat pump and the first side inlet valve assembly, wherein the flow controller is configured to be selectively set in either a pumping mode or in a flowing mode, wherein upon set in the pumping mode the flow controller is configured to act as a pump for pumping heat transfer liquid from the thermal energy grid into the first side inlet of the heat pump, and wherein upon set in flowing mode the flow controller is configured to act as a flow regulator for allowing heat transfer liquid from the thermal energy grid to flow into the first side inlet of the heat pump; and
  a flow mode controller configured to, based on the local pressure difference, selectively control the flow controller to be set in the pumping mode or in the flowing mode.

The wording "selectively set the flow controller in either a pumping mode or in a flowing mode" should be construed as the flow controller is at one point in time set in the pumping mode and at another point in time set in the flowing mode.

The wording "pump" should be construed as a device configured to, in a controlled way, allow heat transfer liquid to be pumped through the pump when the pump is in an active pumping state. In the expression "in a controlled way" it is comprised that the pump may regulate the flow rate of the fluid being pumped by the pump.

The wording "flow regulator" should be construed as device configured to, in a controlled way, allow fluid to flow through the flow regulator when the flow regulator is in an active state. Moreover, the flow regulator may also be arranged such that the flow rate of fluid through the flow regulator may be controlled. Hence, the flow regulator may be arranged to regulate the flow of fluid therethrough.

The design of the reversible heat pump assembly allows it to be connected to a thermal energy circuit wherein the pressure between heat transfer liquid of the hot and cold conduits are allowed to vary both spatially and temporally.

This since the reversible heat pump assembly comprises the pressure difference determining device, and since it is selectively connected to the hot and cold conduit via selectively setting the flow controller in the pumping mode or in the flowing mode. Further, the flow controller allows for an efficient flow control of heat transfer liquid between the hot and cold conduits. Moreover, the flow controller may be made physically compact. Hence, physical space may be saved. Furthermore, the flow controller allows for transfer of heat transfer liquid between the hot and cold conduits in an energy efficient manner.

The flow mode controller may further be configured to base the setting of the flow controller in the pumping mode or the flowing mode on if the reversible heat pump assembly is set either in the heating mode or in the cooling mode.

The reversible heat pump assembly may further comprise:
a pressure difference determining device adapted to determine a local pressure difference between heat transfer liquid of the hot and the cold conduits;
a flow regulator connected in between the first side inlet of the heat pump and the first side inlet valve assembly, wherein the flow regulator is configured to allow heat transfer liquid from the thermal energy grid to flow into the first side inlet of the heat pump;
a pump connected in between the first side inlet of the heat pump and the first side inlet valve assembly, wherein the pump is configured to pump heat transfer liquid from the thermal energy grid into the first side inlet of the heat pump; and
a flow mode controller configured to, based on the local pressure difference, selectively activate either the flow regulator or the pump for transferring heat transfer liquid from the thermal energy grid into the first side inlet of the heat pump.

The design of the reversible heat pump assembly allows it to be connected to a thermal energy circuit wherein the pressure between heat transfer liquid of the hot and cold conduits are allowed to vary both spatially and temporally. This since the reversible heat pump assembly comprises the pressure difference determining devices and since it is selectively connected to the hot and cold conduit, respectively, via the flow regulator and the pump.

The flow mode controller may further be configured to base the activation of either the flow regulator or the pump for transferring heat transfer liquid from the thermal energy grid into the first side inlet of the heat pump on if the reversible heat pump assembly is set either in the heating mode or in the cooling mode.

The flow mode controller may further be configured to base the setting of the flow controller in the pumping mode or the flowing mode on if the reversible heat pump assembly is set either in the heating mode or in the cooling mode.

According to a second aspect a district thermal energy distribution system is provided. The district thermal energy distribution system comprises a thermal energy grid having a hot conduit configured to allow heat transfer liquid of a first temperature to flow therethrough, and a cold conduit configured to allow heat transfer liquid of a second temperature to flow therethrough, the second temperature being lower than the first temperature. The district thermal energy distribution system further comprises a plurality of reversible heat pump assemblies according to the first aspect. The plurality of reversible heat pump assemblies is connected to the thermal energy grid.

The above mentioned features of the reversible heat pump assembly, when applicable, apply to this second aspect as well. In order to avoid undue repetition, reference is made to the above.

The basic idea of the district thermal energy distribution system is based on the insight by the inventors that modern day cities by themselves provide thermal energy that may be reused within the city. The reused thermal energy may be picked up by the district thermal energy distribution system 1 and be used for e.g. space heating or hot tap water preparation. Moreover, increasing demand for space cooling will also be handled within the district thermal energy distribution system. Within the district thermal energy distribution system buildings within the city are interconnected and may in an easy and simple way redistribute low temperature waste energy for different local demands. Amongst other the district thermal energy distribution system will provide for:

Minimizing the use of primary energy due to optimal re-use of energy flows inside the city.

Limiting the need for chimneys or firing places inside the city, since the need for locally burning gas or other fuels will be reduced.

Limiting the need for cooling towers or cooling convectors inside the city, since excess heat produced by cooling devices may be transported away and reused within the district thermal energy distribution system.

Hence, the district thermal energy distribution system provides for a smart duel use of thermal energy within a city. When integrated into a city the district thermal energy distribution system makes use of low level thermal energy waste in both heating and cooling applications within the city. This will reduce the primary energy consumption of a city by eliminating the need for a gas grid or a district heating grid and a cooling grid in city.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

These and other aspects of the present invention will now be described in more detail, with reference to the appended drawings showing embodiments of the invention. The figures are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and to fully convey the scope of the invention to the skilled person.

Figure 1:
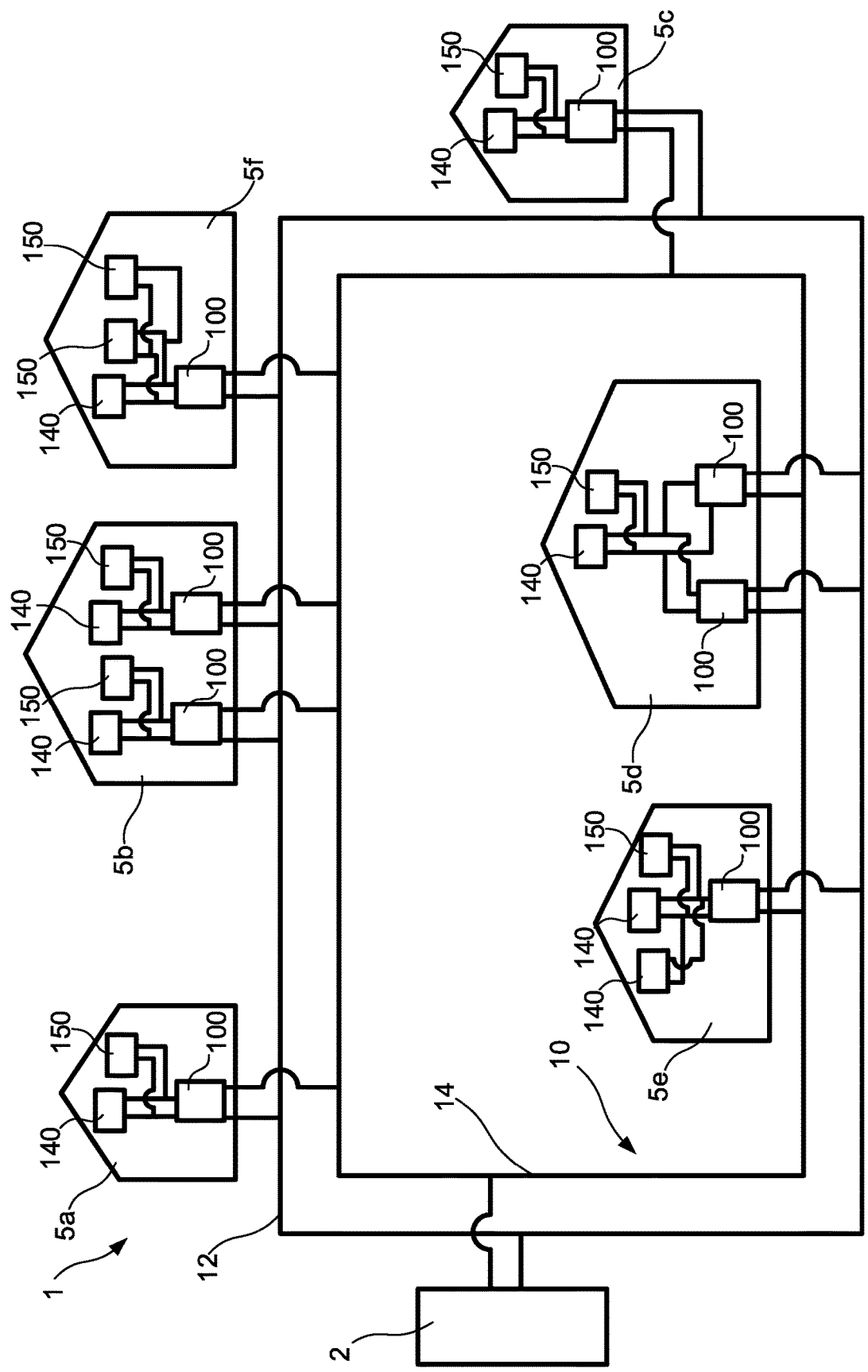
FIG. 1 is a schematic diagram of a district thermal energy distribution system.

In FIG. 1 a district thermal energy distribution system 1 is illustrated. The district thermal energy distribution system 1 comprises a thermal energy circuit 10 and a plurality of buildings 5. The thermal energy circuit 10 is configured to interconnect the buildings 5 such that thermal energy in the form of heating and/or cooling may be distributed to and/or from the buildings 5. Hence, the thermal energy circuit 10 may be seen as a district thermal energy circuit. The plurality of buildings 5 are thermally coupled to the thermal energy circuit 10. The thermal energy circuit 10 is arranged to circulate and store thermal energy in heat transfer liquid flowing through the thermal energy circuit 10.

The heat transfer liquid of the thermal energy circuit 10 may comprise water. However, other heat transfer liquids may alternatively be used. Some non-limiting examples are ammonia, oils, alcohols and anti-freezing liquids, such as glycol. The heat transfer liquid may also comprise a mixture of two or more of the heat transfer liquids mentioned above. A specific mixture to be used is water mixed with an anti-freezing liquid.

The thermal energy circuit 10 comprises two conduits 12, 14 for allowing flow of heat transfer liquid therethrough. The temperature of the heat transfer liquid of the two conduits 12, 14 is set to be different. A hot conduit 12 in the thermal energy circuit 10 is configured to allow heat transfer liquid of a first temperature to flow therethrough. A cold conduit 14 in the thermal energy circuit 10 is configured to allow heat transfer liquid of a second temperature to flow therethrough. The second temperature is lower than the first temperature.

In case heat transfer liquid is water (possibly with added anti-freezing liquid), a suitable temperature range for the hot heat transfer liquid is between 5 and 45° C. and a suitable temperature range for the cold heat transfer liquid is between 0 and 40° C. A suitable temperature difference between the first and second temperatures is in the range of 5-16° C., preferably in the range of 7-12° C., more preferably 8-10° C.

Preferably, the system is set to operate with a sliding temperature difference which varies depending on the climate. Preferably, the sliding temperature difference is fixed. Hence, the temperature difference may be set to momentarily slide with a fixed temperature difference.

The hot conduit 12 and the cool conduit 14 are separate. The hot conduit 12 and the cool conduit 14 may be parallelly arranged. The hot conduit 12 and the cool conduit 14 may be arranged as closed loops of piping. The hot conduit 12 and the cool conduit 14 are fluidly interconnected at the buildings 5 for allowing of thermal energy transfer to and from the buildings 5. This will be discussed more in detail further below.

The two conduits 12, 14 of the thermal energy circuit 10 may be formed by plastic, composite, concrete, or metal pipes. According to one embodiment High Density Polyethylene (HDPE) pipes may be used. The pipes may be single wall pipes. The pipes may be uninsulated. According to one embodiment the thermal energy circuit 10 is mainly arranged in the ground. The ground will be used as thermal inertia of the thermal energy circuit 10. Hence, insulation of the piping gives no extra value. Exceptions are installation in cities with a very warm climate or cities with very cold climate. Here the inertia of the ground may be more harmful than good during critical parts of the year. Here insulation on one or both pipes of the piping may be needed.

According to one embodiment the two conduits 12, 14 of the thermal energy circuit 10 are dimensioned for pressures up to 1 MPa (10 bar). According to other embodiments the two conduits 12, 14 of the thermal energy circuit 10 may be dimensioned for pressures up to 0.6 MPa (6 bar) or for pressures up to 1.6 MPa (16 bar).

The district thermal energy distribution system 1 may comprise a thermal server plant 2. The thermal server plant 2 functions as an external thermal source and/or thermal sink. The function of the thermal server plant 2 is to maintain the temperature difference between the hot and cold conduits 12, 14 of the thermal energy circuit 10. That is, the thermal server plant 2 may be used for balancing the district thermal energy distribution system 1 such that when the thermal energy circuit 10 reaches a temperature end point the thermal server plant 2 is arranged to inhale or exhale thermal energy to/from the thermal energy circuit 10. In winter time, when there is higher probability that the hot conduit 12 reaches its' lowest temperature end point, the thermal server plant 2 is used for adding thermal energy to the thermal energy circuit 10. In summer time, when there is higher probability that the cold conduit reaches its' highest temperature end point, the thermal server plant 2 is used to subtract thermal energy from the thermal energy circuit 10.

A building 5 comprises at least one reversible heat pump assembly 100. One specific building 5 may comprise more than one reversible heat pump assembly 100.

The reversible heat pump assembly 100 is configured to be connected to the thermal energy circuit 10. The reversible heat pump assembly 100 is configured to be connected to a heating circuit 140. The reversible heat pump assembly 100 is configured to be connected to a cooling circuit 150.

The heating circuit 140 may be a local heating circuit configured within a building 5. The heating circuit 140 is configured to allow heat transfer liquid to flow therethrough. The heating circuit 140 may be one or more of a comfort heating system, a process heating system, and hot tap water production system.

The cooling circuit 140 may be a local cooling circuit configured within a building 5. The cooling circuit 150 is configured to allow heat transfer liquid to flow therethrough. The cooling circuit 150 may be one or more of a comfort cooling system, a process cooling system, a refrigeration system, and a freezing system.

The reversible heat pump assembly 100 may be set to operate in either a heating mode or a cooling mode. Hence, a specific reversible heat pump assembly 100 may selectively be set in either the heating mode or the cooling mode.

In the heating mode the reversible heat pump assembly 100 is acting as a thermal sink. Hence, the reversible heat pump assembly 100 is arranged to remove thermal energy from the thermal energy circuit 10. Or in other words, the reversible heat pump assembly 100 is arranged to transfer thermal energy from heat transfer liquid of the thermal energy circuit 10 to heat transfer liquid of the heating circuit 140. This is achieved by transfer of thermal energy from heat transfer liquid taken from the hot conduit 12 to heat transfer liquid of the heating circuit 140, such that heat transfer liquid returned to the cold conduit 14 has a temperature lower than the first temperature and preferably a temperature equal to the second temperature.

Hence, a reversible heat pump assembly 100 may be installed in a building 5 for acting as a provider for heat to one or more local heating circuits 140. As a non-limiting example, a local heating circuit 140 may be arranged to deliver space heating, process heating or hot tap hot water preparation. Alternatively, or in combination, the local heating circuit 140 may deliver pool heating or ice- and snow purging. Hence, the reversible heat pump assembly 100, upon being set in the heating mode, is configured to derive heat from heat transfer liquid of the hot conduit 12 and to create a cooled heat transfer liquid flow into the cold conduit 14. Hence, upon being set in the heating mode, the reversible heat pump assembly 100 fluidly interconnects the hot and cool conduits 12, 14 such that hot heat transfer liquid can flow from the hot conduit 12 through the reversible heat pump assembly 100 and then into the cool conduit 14 after thermal energy in the heat transfer liquid has been consumed by the reversible heat pump assembly 100. Upon being set in the heating mode, the reversible heat pump assembly 100 operates to draw thermal energy from the hot conduit 12 to heat the heating circuit 140 and then deposits the cooled heat transfer liquid into the cool conduit 14.

In the cooling mode the reversible heat pump assembly 100 is acting as a thermal source. Hence, the reversible heat pump assembly 100 is arranged to deposit thermal energy to the thermal energy circuit 10. Or in other words, the reversible heat pump assembly 100 is arranged to transfer thermal energy from heat transfer liquid of the cooling circuit 150 to heat transfer liquid of the thermal energy circuit 10. This is achieved by transfer of thermal energy from heat transfer liquid of the cooling circuit 150 to heat transfer liquid taken from the cold conduit 12, such that heat transfer liquid returned to the hot conduit 12 has a temperature higher than the second temperature and preferably a temperature equal to the first temperature.

Hence, a reversible heat pump assembly 100 may be installed in a building 5 for acting as a provider for cooling to one or more local cooling circuits 150. As a non-limiting example a local cooling circuit 150 may be arranged to deliver space cooling, process cooling or cooling for freezers and refrigerators. Alternatively, or in combination, the local cooler may deliver cooling for ice rinks and ski centers or ice- and snow making. Hence, the reversible heat pump assembly 100, upon being set in the cooling mode, is configured to derive cooling from heat transfer liquid of the cold conduit 14 and to create a heated heat transfer liquid flow into the hot conduit 12. Hence, upon being set in the cooling mode, the reversible heat pump assembly 100 fluidly interconnects the cold and hot conduits 14, 12 such that cold heat transfer liquid can flow from the cold conduit 14 through the reversible heat pump assembly 100 and then into the hot conduit 12 after thermal energy has been deposited into the heat transfer liquid by the reversible heat pump assembly 100. The reversible heat pump assembly 100 operates to extract heat from the cooling circuit 150 and deposits that extracted heat into the hot conduit 12.

A specific reversible heat pump assembly 100 may be connected to one heating circuit 140 and to one cooling circuit 150. This is e.g. illustrated in buildings 5a and 5c of FIG. 1.

A building may comprise a plurality of reversible heat pump assemblies 100 each being connected to one heating circuit 140 and to one cooling circuit 150. This is e.g. illustrated in buildings 5b of FIG. 1.

A plurality of reversible heat pump assemblies 100 may be connected to one heating circuit 140 and to one cooling circuit 150. This is e.g. illustrated in buildings 5d of FIG. 1. If so, one of the plurality of reversible heat pump assemblies 100 may be set in the heating mode for providing heating to the one heating circuit 140 and another one of the plurality of reversible heat pump assemblies 100 may be set in the cooling mode for providing cooling to the one cooling circuit 150. Alternatively, two or more of the plurality of reversible heat pump assemblies 100 may be set in the heating mode for providing heating to the one heating circuit 140. Yet alternatively, two or more of the plurality of reversible heat pump assemblies 100 may be set in the cooling mode for providing cooling to the one cooling circuit 150. Further alternatively, all of the plurality of reversible heat pump assemblies 100 may be set in the heating mode for providing heating to the one heating circuit 140. Alternatively, all of the plurality of reversible heat pump assemblies 100 may be set in the cooling mode for providing cooling to the one cooling circuit 150. At a first specific point in time one of the alternative settings of the plurality of reversible heat pump assemblies 100 indicated above may be used, at another specific point in time another one of the alternative settings of the plurality of reversible heat pump assemblies 100 indicated above may be used. Hence, depending of the heating and cooling needs of the heating circuit 140 and the cooling circuit 150 the plurality of reversible heat pump assemblies 100 may be set differently.

A specific reversible heat pump assembly 100 may be connected to a plurality of heating circuits 140. This is e.g. illustrated in buildings 5e of FIG. 1. If so, the reversible heat pump assembly 100 may be configured to deliver heat to one of the plurality of heating circuits 140 at a first point in time and to another one of the heating circuits 140 at second point in time, the second point in time being different from the first point in time.

A specific reversible heat pump assembly 100 may be connected to a plurality of cooling circuits 150. This is e.g. illustrated in buildings 5f of FIG. 1. If so, the reversible heat pump assembly 100 may be configured to deliver cooling to one of the plurality of cooling circuits 150 at a first point in time and to another one of the cooling circuits 150 at second point in time, the second point in time being different from the first point in time.

Figure 2:
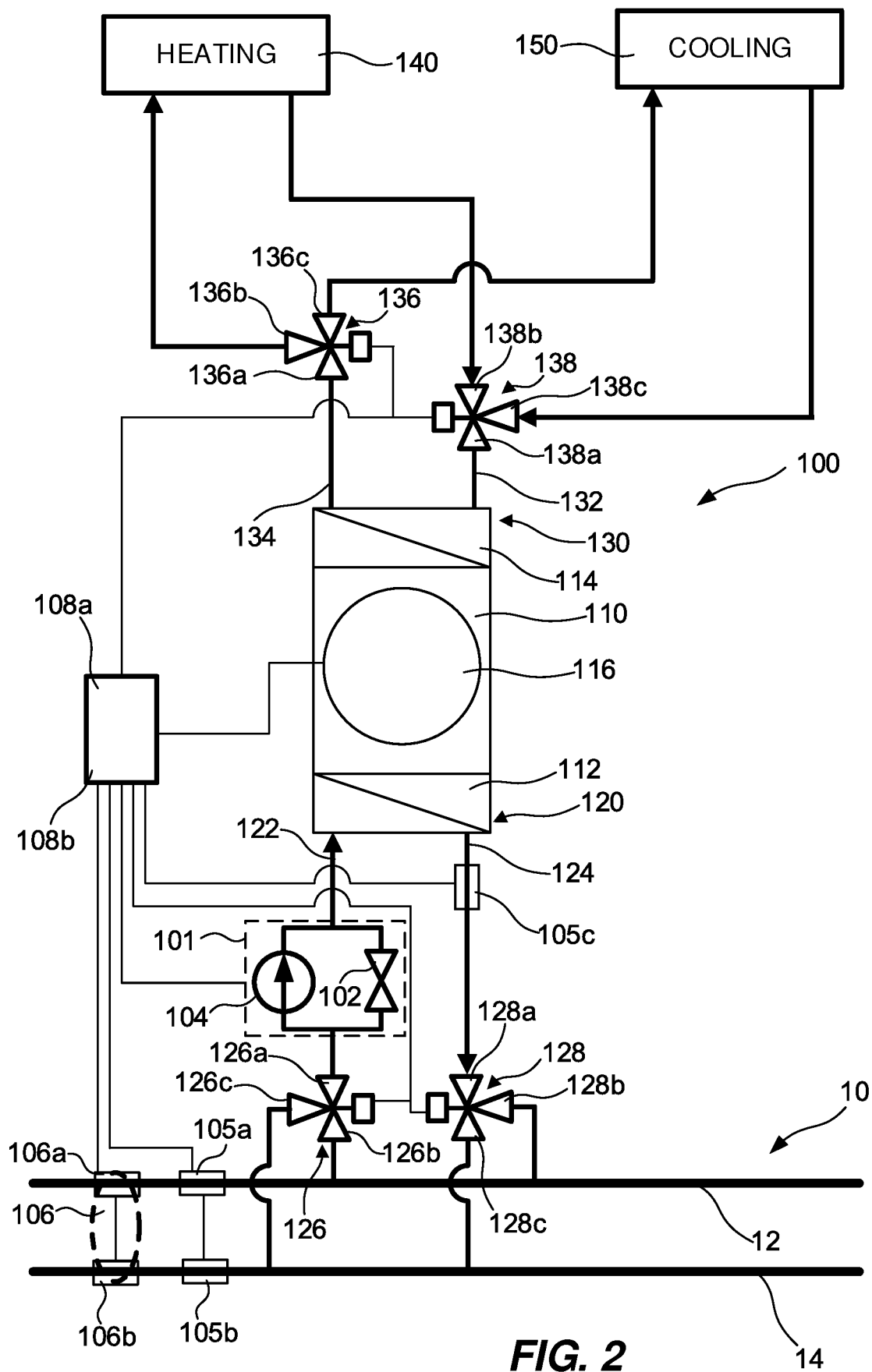
FIG. 2 is a schematic diagram of a reversible heat pump assembly connected to a thermal energy grid, to a heating circuit, and to a cooling circuit.

With reference to FIG. 2 the function of a reversible heat pump assembly 100 will now be discussed. The reversible heat pump assembly 100 comprises a heat pump 110 having a first side 120 and a second side 130, a first side inlet valve assembly 126, a second side outlet valve assembly 136.

The first side 120 of the heat pump 110 comprises a first side inlet 122 and a first side outlet 124 allowing heat transfer liquid to flow through the first side 120 of the heat pump 110. Hence, the heat pump 110 is configured such that heat transfer liquid of the district thermal energy distribution system 1 is allowed flow through the first side 120 of the heat pump 110 via the first side inlet 122 and the first side outlet 124.

The second side 130 of the heat pump 110 comprises a second side inlet 132 and a second side outlet 134 allowing heat transfer liquid to flow through the second side 130 of the heat pump 110. Hence, the heat pump 110 is configured such that heat transfer liquid of the heating circuit 140 and/or the cooling circuit 150 is allowed flow through the second side 130 of the heat pump 110 via the second side inlet 132 and the second side outlet 134.

The first side inlet valve assembly 126 comprises a heat pump connection 126a connected to the first side inlet 122, a hot conduit connection 126b arranged to be connected to the hot conduit 12 of a thermal energy grid 10, and a cold conduit connection 126c arranged to be connected to the cold conduit 14 of the thermal energy grid 10. All the connections 126a-c of the first side inlet valve assembly 126 are configured to fluidly connect the first side inlet valve assembly 126 to the respective device/conduit. Any such connection may be made using piping. Hence, the heat pump connection 126a is configured to fluidly connect the first side inlet valve assembly 126 with the first side inlet 122 of the heat pump 110. The hot conduit connection 126b is arranged to fluidly connect the first side inlet valve assembly 126 with the hot conduit 12 of a thermal energy grid 10. The cold conduit connection 126c is arranged to fluidly connect the first side inlet valve assembly 126 with the cold conduit 14 of a thermal energy grid 10.

The second side outlet valve assembly 136 comprises a heat pump connection 136a connected to the second side outlet 134, a heating circuit connection 136b arranged to be connected to a heating circuit 140, and a cooling circuit connection 136c arranged to be connected to a cooling circuit 150. All the connections 136a-c of the second side outlet valve assembly 136 are configured to fluidly connect the second side outlet valve assembly 136 to the respective device/circuit. Any such connection may be made using piping. Hence, the heat pump connection 136a is configured to fluidly connect the second side outlet valve assembly 136 with the second side outlet 134 of the heat pump 110. The heating circuit connection 136b is arranged to fluidly connect the second side outlet valve assembly 136 with the heating circuit 140. The cooling circuit connection 136c is arranged to fluidly connect the second side outlet valve assembly 136 with the cooling circuit 150.

The reversible heat pump assembly 100 is configured to be selectively set in either a heating mode or a cooling mode. Hence, at a specific point in time the reversible heat pump assembly 100 may be set in one of the heating mode or a cooling mode.

Upon the reversible heat pump assembly 100 is set in the heating mode, the heat pump 110 is configured to transfer heat from the first side 120 to the second side 130. Upon the reversible heat pump assembly 100 is set in the heating mode, the first side inlet valve assembly 126 is configured to fluidly connect the hot conduit connection 126b and the heat pump connection 126a. Upon the reversible heat pump assembly 100 is set in the heating mode, the second side outlet valve assembly 136 is configured to fluidly connect the heat pump connection 136a and the heating circuit connection 136b. Upon the reversible heat pump assembly 100 is set in the heating mode, the first side inlet valve assembly 126 may be configured to fluidly disconnect the cold conduit connection 126c from the heat pump connection 126a. Upon the reversible heat pump assembly 100 is set in the heating mode, the second side outlet valve assembly 136 may be configured to fluidly disconnect the heat pump connection 136a from the cooling circuit connection 136c.

Upon the reversible heat pump assembly 100 is set in the cooling mode, the heat pump 110 is configured to transfer heat from the second side 130 to the first side 120. Upon the reversible heat pump assembly 100 is set in the cooling mode, the first side inlet valve assembly 126 is configured to fluidly connect the cold conduit connection 126c and the heat pump connection 126a. Upon the reversible heat pump assembly 100 is set in the cooling mode, the second side outlet valve assembly 136 is configured to fluidly connect the heat pump connection 136a and the cooling circuit connection 136c. Upon the reversible heat pump assembly 100 is set in the cooling mode, the first side inlet valve assembly 126 may be configured to fluidly disconnect the hot conduit connection 126b from the heat pump connection 126a. Upon the reversible heat pump assembly 100 is set in the cooling mode, the second side outlet valve assembly 136 may be configured to fluidly disconnect the heat pump connection 136a from the heating circuit connection 136b.

Hence, the heat pump 110 is configured to transfer heat from the first side 120 to the second side 130 or vice versa. Such a heat pump 110 may be referred to as a reversible heat pump. The reversible heat pump may comprise a first side coil 112, a second side coil 114 and a reversing valve 116.

Upon the heat pump assembly 100 is set in the heating mode the first side coil 112 is configured to work as an evaporator, the second side coil 114 is configured to work as a condenser, and the reversing valve 116 is set such that refrigerant of the heat pump 110 is flowing from the first side coil 112 to the second side coil 114. Hence, the refrigerant flowing from the first side coil 112 (acting as an evaporator) carries thermal energy from thermal energy grid 10 to the second side 130 of the heat pump 110. Vapor temperature is augmented within the heat pump 110 by compressing it. The second side coil 114 (acting as a condenser) then transfers thermal energy (including energy from the compression) to the second side outlet 134 of the heat pump 110. The transferred heat will heat transfer liquid of the heating circuit 140. The refrigerant is then allowed to expand, and hence cool, and absorb heat from the thermal energy grid 10 in the first side coil 112 (acting as an evaporator), and the cycle repeats.

Upon the heat pump assembly 100 is set in the cooling mode the second side coil 114 is configured to work as an evaporator, the first side coil 112 is configured to work as a condenser, and the reversing valve 116 is set such that refrigerant of the heat pump 110 is flowing from the second side coil 114 to the first side coil 112. Hence, upon the heat pump assembly 100 is set in the cooling mode the cycle is similar to what was discussed above in connection with the heat pump assembly 100 is set in the heating mode, but the first side coil 112 is now the condenser and the second side coil 114 (which reaches a lower temperature) is the evaporator.

The heat pump assembly 100 may further comprise a first side outlet valve assembly 128. The first side outlet valve assembly 128 comprises a heat pump connection 128a connected to the first side outlet 124, a hot conduit connection 128b arranged to be connected to a hot conduit 12 of a thermal energy grid 10, and a cold conduit connection 128c arranged to be connected to a cold conduit 14 of the thermal energy grid 10. All the connections 128a-c of the first side outlet valve assembly 128 are configured to fluidly connect the first side outlet valve assembly 128 to the respective device/conduit. Any such connection may be made using piping. Hence, the heat pump connection 128a is configured to fluidly connect the first side outlet valve assembly 128 with the first side outlet 124 of the heat pump 110. The hot conduit connection 128b is arranged to fluidly connect the first side outlet valve assembly 128 with the hot conduit 12 of a thermal energy grid 10. The cold conduit connection 128c is arranged to fluidly connect the first side outlet valve assembly 128 with the cold conduit 14 of a thermal energy grid 10. Upon the reversible heat pump assembly 100 is set in the heating mode, the first side outlet valve assembly 128 is configured to fluidly connect the heat pump connection 128*a* and the cold conduit connection 126*c*. Upon the reversible heat pump assembly 100 is set in the heating mode, the first side outlet valve assembly 128 may be configured to fluidly disconnect the heat pump connection 128*a* from the hot conduit connection 128*b*. Upon the reversible heat pump assembly 100 is set in the cooling mode, the first side outlet valve assembly 128 is configured to fluidly connect the heat pump connection 128*a* and the hot conduit connection 128*b*. Upon the reversible heat pump assembly 100 is set in the cooling mode, the first side outlet valve assembly 128 may be configured to fluidly disconnect the heat pump connection 128*a* from cold conduit connection 128*c*.

The heat pump assembly 100 may further comprise a second side inlet valve assembly 138. The second side inlet valve assembly 138 comprises a heat pump connection 138*a* connected to the second side inlet 132, a heating circuit connection 138*b* arranged to be connected to the heating circuit 140 and a cooling circuit connection 138*c* arranged to be connected to the cooling circuit 150. All the connections 138*a*-*c* of the second side inlet valve assembly 138 are configured to fluidly connect the second side inlet valve assembly 138 to the respective device/circuit. Any such connection may be made using piping. Hence, the heat pump connection 138*a* is configured to fluidly connect the second side inlet valve assembly 138 with the second side inlet 132 of the heat pump 110. The heating circuit connection 138*b* is arranged to fluidly connect the second side inlet valve assembly 138 with the heating circuit 140. The cooling circuit connection 138*c* is arranged to fluidly connect the second side inlet valve assembly 138 and the cooling circuit 150. Upon the reversible heat pump assembly 100 is set in the heating mode, the second side inlet valve assembly 138 is configured to fluidly connect the heat pump connection 138*a* with the heating circuit connection 138*b*. Upon the reversible heat pump assembly 100 is set in the heating mode, the second side inlet valve assembly 138 may be configured to fluidly disconnect the heat pump connection 138*a* from the cooling circuit connection 136*c*. Upon the reversible heat pump assembly 100 is set in the cooling mode, the second side inlet valve assembly 138 is configured to fluidly connect the heat pump connection 138*a* and the cooling circuit connection 138*c*. Upon the reversible heat pump assembly 100 is set in the cooling mode, the second side inlet valve assembly 138 may be configured to fluidly disconnect the heat pump connection 138*a* from the heating circuit connection 138*b*.

The heat pump assembly 100 may further comprise a heat pump assembly mode controller 108*a*. The heat pump assembly mode controller 108*a* is configured to set the heat pump assembly 100 in the heating mode or in the cooling mode. This may e.g. be made by the heat pump assembly mode controller 108*a* being configured to control the heat pump 110, the first side inlet valve assembly 126 and/or the second side outlet valve assembly 136. The heat pump assembly mode controller 108*a* may further be configured to control the first side outlet valve assembly 128. The heat pump assembly mode controller 108*a* may further be configured to control the second side inlet valve assembly 138. The heat pump assembly mode controller 108*a* is typically software implemented. However, the heat pump assembly mode controller 108*a* may be a combined hardware and software implementation. The software portions of the heat pump assembly mode controller 108*a* may be run on a processing unit. The heat pump assembly mode controller 108*a* is configured to send control signal to the assembly portions of the heat pump assembly 100 to be controlled by the heat pump assembly mode controller 108*a*.

The heat pump assembly mode controller 108*a* may be configured to set the heat pump assembly 100 in the heating mode or in the cooling mode based on one or more demand signals indicative of what heating and/or cooling demands are needed in the building 5 wherein the heat pump assembly 100 is installed. Hence, heat pump assembly mode controller 108*a* is configured to receive one or more demand signals from heating and cooling systems of the building 5 wherein the heat pump assembly 100 is installed. Each heating system of the building 5 comprises one or more heating circuits 140 connected to the heat pump assembly 100. Each cooling system of the building 5 comprises one or more cooling circuits 150 connected to the heat pump assembly 100. Examples of heating systems are a hot water production system (e.g. a domestic hot water production system), a comfort heating system, and a process heating system. Examples of cooling systems are a comfort cooling system and a process cooling system. The heat pump assembly mode controller 108*a* may be configured to prioritize the demands from the different heating and cooling systems differently. For example, the heat pump assembly mode controller 108*a* may be configured to prioritize a hot water production system higher than a comfort heating system or a cooling system. The heat pump assembly mode controller 108*a* may be configured to set which one of a plurality of heating circuits 140 to be provided with heating from the heat pump assembly 100. The heat pump assembly mode controller 108*a* may be configured to set which one of a plurality of cooling circuits 150 to be provided with cooling from the heat pump assembly 100.

The heat pump assembly 100 may further comprise a pressure difference determining device 106. The pressure difference determining device 106 is configured to determine a local pressure difference, $\Delta p$, between heat transfer liquid of the hot and the cold conduits 12; 14 of the thermal energy circuit 10. $\Delta p$ is preferably measured in the vicinity to where the heat pump assembly 100 is connected to the thermal energy circuit 10. The pressure difference determining device 106 may comprises a hot conduit pressure determining device 106*a* and a cold conduit pressure determining device 106*b*. The hot conduit pressure determining device 106*a* is arranged to be connected to the hot conduit 12 for measuring a local pressure, $p_{1h}$, of heat transfer liquid of the hot conduit 12. The cold conduit pressure determining device 106*b* is arranged to be connected to the cold conduit 14 for measuring a local pressure, $p_{1c}$, of heat transfer liquid of the cold conduit 14. The pressure difference determining device 106 is configured to determine $\Delta p$ as a pressure difference between the local pressure of heat transfer liquid of the hot conduit 12 and the local pressure of heat transfer liquid of the cold conduit 14.

The pressure difference determining device 106 may be implemented as a hardware device, a software device, or as a combination thereof. The consumer assembly pressure difference determining device 106 is arranged to generate a local pressure difference signal indicative of the consumer assembly local pressure difference, $\Delta p$. The pressure difference determining device 106 may be configured to send the local pressure difference signal to a flow mode controller 108*b*. The flow mode controller 108*b* is typically software implemented. However, the flow mode controller 108*b* may be a combined hardware and software implementation. The software portions of the flow mode controller 108*b* may be run on a processing unit. The flow mode controller 108b and the heat pump assembly mode controller 108a may be implemented as a single device.

The heat pump assembly 100 may further comprise a flow controller 101. The flow controller 101 is configured to control the flow of heat transfer fluid from the thermal energy grid 10 to the heat pump 110. Hence, the flow controller 101 is connected in between the thermal energy grid 10 and the heat pump 110. The flow controller 101 may be connected in between the first side inlet valve assembly 126 and the first side inlet 122. This is preferred since only one flow controller 101 is needed. Hence, the heat pump 110 is connected to the thermal energy grid 10 via the flow controller 101. The flow controller 101 is selectively set in a pumping mode or in a flowing mode. The flow controller 101 is selectively set in the pumping mode or in the flowing mode based on a heat pump assembly local delivery differential pressure, $\Delta p_{dp}$, according to the following:

$$\Delta p_{dp} = \Delta p + \Delta p_{che}$$

wherein $\Delta p_{che}$ is a differential pressure for overcoming the pressure drop over the heat pump 110 and possible also the first side inlet valve assembly 126 and/or the first side outlet valve assembly 128. This will be discussed in more detail below. The flow mode controller 108b may be configured to set the flow controller 101 in the pumping mode or in a flowing mode. Embodiments of a flow controller 101 may e.g. be found in PCT/EP2017/083077 by the same applicant.

Upon set in the pumping mode the flow controller 101 is configured to act as a pump 104 for pumping heat transfer liquid from the thermal energy grid 10 into the heat pump 110. Hence, upon the flow controller 101 being set in the pumping mode, heat transfer liquid from the thermal energy grid 10 is pumped into the heat pump 110. Upon set in flowing mode the flow controller 101 is configured to act as a flow regulator 102 for allowing heat transfer liquid from the thermal energy grid 10 to flow into the heat pump 110. The flow regulator 102 may be seen as a valve. Hence, upon the flow controller 101 being set in the flowing mode, heat transfer liquid from the thermal energy grid 10 is allowed to flow into the heat pump 110. Again, the choice of allowing heat transfer liquid from the thermal energy grid 10 to flow into the heat pump 110 or pumping heat transfer liquid from the thermal energy grid 10 into the heat pump 110, is made based on the heat pump assembly local delivery differential pressure, $\Delta p_{dp}$.

The flow mode controller 108b is configured to selectively set the flow controller 101 in the pumping mode or in the flowing mode. In the pumping mode the flow controller 101 is acting as a pump 104. In the flowing mode the flow controller 101 is acting as a flow regulator 102. Hence, the flow controller 101 is configured to selectively act as a pump 104 or as a flow regulator 102. The flow controller 101 is configured to, upon acting as a pump 104, pump heat transfer liquid through the flow controller 101. The flow controller 101 is configured to, upon acting as a flow regulator 102, allow heat transfer liquid to flow through the flow controller 101.

In the thermal energy circuit 10 a differential pressure between heat transfer liquid in hot and cold conduits 12, 14 may change over time. More precisely, the differential pressure between heat transfer liquid of the hot and cold conduits 12, 14 may change such that the differential pressure changes from positive to negative or vice versa. Depending on the variating differential pressure between the hot and cold conduits 12, 14 of the thermal energy circuit 10 and depending on if the reversible heat pump assembly 100 is set in the heating mode or in the cooling mode sometimes heat transfer liquid of the thermal energy circuit 10 need to be pumped through the reversible heat pump assembly 100 and sometimes heat transfer liquid of the thermal energy circuit 10 need to be allowed to flow through the reversible heat pump assembly 100. Some examples are given directly below.

Assume that the reversible heat pump assembly 100 is set in the heating mode. Hence, heat transfer liquid of the thermal energy circuit 10 is set to be transferred from the hot conduit 12 via the first side 120 of the heat pump 110 to the cold conduit 14. In case the heat pump assembly local delivery differential pressure, $\Delta p_{dp}$, is indicative of that there is a higher local pressure in the hot conduit 12 than in the cold conduit 14 the flow controller 101 shall be set to allow a flow of heat transfer liquid to flow through the flow controller 101. Hence, the flow mode controller 108b is configured to set the flow controller 101 in the flowing mode. In case the heat pump assembly local delivery differential pressure, $\Delta p_{dp}$, is indicative of that there is a lower local pressure in the hot conduit 12 than in the cold conduit 14 the flow controller 101 shall be set to pump a flow of heat transfer liquid from the hot conduit 12 to the cold conduit 14. Hence, the flow mode controller 108b is configured to set the flow controller 101 in the pumping mode.

Assume that the reversible heat pump assembly 100 is set in the cooling mode. Hence, heat transfer liquid of the thermal energy circuit 10 is set to be transferred from the cold conduit 14 via the first side 120 of the heat pump 110 to the hot conduit 16. In case the heat pump assembly local delivery differential pressure, $\Delta p_{dp}$, is indicative of that there is a higher local pressure in the cold conduit 14 than in the hot conduit 12 the flow controller 101 shall be configured to allow a flow of heat transfer liquid to flow through the flow controller 101. Hence, the flow mode controller 108b is configured to set the flow controller 101 in the flowing mode. In case the heat pump assembly local delivery differential pressure, $\Delta p_{dp}$, is indicative of that there is a lower local pressure in the cold conduit 14 than in the hot conduit 12 the flow controller 101 shall be configured to pump a flow of heat transfer liquid from the cold conduit 14 to the hot conduit 12. Hence, the flow mode controller 108b is configured to set the flow controller 101 in the pumping mode.

The flow mode controller 108b may also be configured to control the flow rate of heat transfer liquid through the flow controller 101. Accordingly, the flow mode controller 108b may also be configured to control the pump 104 of the flow controller 101 such that the flow rate of heat transfer liquid pumped by the pump 104 is controlled. Moreover, the flow mode controller 108b may also be configured to control the flow regulator 102 such that the flow rate of heat transfer liquid flowing through the flow controller 101 is controlled.

The reversible heat pump assembly 100 may further comprise a hot conduit temperature determining device 105a and a cold conduit temperature determining device 105b. The hot conduit temperature determining device 105a is arranged to be connected to the hot conduit 12 for measuring a local temperature, $t_h$, of heat transfer liquid of the hot conduit 12. The cold conduit temperature determining device 105b is arranged to be connected to the cold conduit 14 for measuring a local temperature, $t_c$, of the heat transfer liquid of the cold conduit 14. The hot conduit temperature determining device 105a and the cold conduit temperature determining device 105b may connected to the flow mode controller 108b for communicating $t_h$ and $t_c$ thereto.

The reversible heat pump assembly 100 may further comprise an outlet temperature determining device 105c.

The outlet temperature determining device 105c is arranged to be connected to a return conduit connecting the first side outlet 124 of the heat pump 110 and the first side outlet valve assembly 128. The outlet temperature determining device 105c is arranged to measure an outlet temperature, $t_{return}$, of heat transfer liquid exiting the first side outlet 124 of the heat pump 110 and being returned to the thermal energy circuit 10. The outlet temperature determining device 105c may be connected to the flow mode controller 108b for communicating $t_{return}$ thereto.

The different temperatures $t_h$, $t_c$ and $t_{return}$ may be used for controlling the flow rate of heat transfer liquid of the thermal energy circuit 10 through heat pump 110. Upon the reversible heat pump assembly 100 is set in the heating mode the flow rate is preferably controlled such that the $t_{return}=t_c$. Upon the reversible heat pump assembly 100 is set in the cooling mode the flow rate is preferably controlled such that the $t_{return}=t_h$. Alternatively, or in combination, and independent upon if the reversible heat pump assembly 100 is set in the heating mode or in the cooling mode, the flow rate of heat transfer liquid of the thermal energy circuit 10 through heat pump 110 may be controlled such that the heat pump 110 inhale or exhale heat at a defined temperature difference. A temperature difference of 8-10° C. corresponds to optimal flows through the heat pump 110. The flow rate of heat transfer liquid of the thermal energy circuit 10 through heat pump 110 may be controlled by the flow mode controller 108b by controlling the flow rate through the flow controller 101.

Hence, a reversible heat pump assembly 100 is disclosed. The heat pump assembly 100 comprises a heat pump 110 having a first side 120 and a second side 130. The heat pump 110 is configured to transfer heat from the first side 120 to the second side 130 or vice versa. The heat pump assembly 100 further comprises a first side inlet valve assembly 126 having a heat pump connection 126a connected to the first side 120, and hot and cold conduit connections 126b; 126c arranged to be connected to the thermal energy grid 10 comprising hot and cold conduits 12; 14. The heat pump assembly 100 further comprise a second side outlet valve assembly 136 having a heat pump connection 136a connected to the second side 130, and heating and cooling circuit connections 136b; 136c arranged to be connected to heating and cooling circuits 130; 140, respectively. The reversible heat pump assembly 100 is configured to be selectively set in either a heating mode or a cooling mode. In the heating mode the heat pump 110 is configured to transfer heat from the first side 120 to the second side 130. In the heating mode the first side inlet valve assembly 126 is configured to fluidly connect the hot conduit connection 126b and the heat pump connection 126a. In the heating mode the second side outlet valve assembly 136 is configured to fluidly connect the heat pump connection 136a and the heating circuit connection 136b. In the cooling mode the heat pump 110 is configured to transfer heat from the second side 130 to the first side 120. In the cooling mode the first side inlet valve assembly 126 is configured to fluidly connect the cold conduit connection 126c and the heat pump connection 126a. In the cooling mode the second side outlet valve assembly 136 is configured to fluidly connect the heat pump connection 136a and the cooling circuit connection 136c.

Moreover, a district thermal energy distribution system 1, comprising the hot and the cold conduits 12, 14 is provided. The district thermal energy distribution system 1 also comprises one or more reversible heat pump assemblies 100. Accordingly, the district thermal energy distribution system 1 comprises a thermal energy circuit 10 comprising the hot and cold conduit 12, 14 for allowing flow of heat transfer liquid therethrough. The district thermal energy distribution system 1 further comprises one or more reversible heat pump assemblies 100. In accordance with what has been disclosed above the one or more reversible heat pump assemblies 100 may be connected to the thermal energy circuit 10 via a flow controller 101. The flow controller 101 is selectively set in pumping mode or a flowing mode based on the local pressure difference between heat transfer liquid of the hot and cold conduits 12, 14. Alternatively or in addition, the district thermal energy distribution system 1 may comprise one or more reversible heat pump assemblies 100 selectively connected to the thermal energy circuit 10 via a valve (e.g. a flow regulator) and a pump. Hence, instead of using a flow controller 101 according to the above a reversible heat pump assembly 100 may be connected to the thermal energy circuit 10 via a valve and via a pump. Depending on the mode of the reversible heat pump assembly 100 and on the local pressure difference between the hot and cold conduits 12; 14 of the thermal energy circuit 10 at the connection between the reversible heat pump assembly 100 and thermal energy circuit 10 either the valve or the pump is used for letting heat transfer liquid of the thermal energy circuit 10 to flow through the first side 120 of the heat pump 110 of the reversible heat pump assembly 100.

Preferably, the demand to inhale or exhale heat using the reversible heat pump assembly 100 is made at a defined temperature difference. A temperature difference of 8-10° C. corresponds to optimal flows through the heat pump 110.

The local pressure difference between the hot and cold conduits 12, 14 may vary along the thermal energy circuit 10. Especially, the local pressure difference between the hot and cold conduits 12, 14 may vary from positive to negative pressure difference seen from one of the hot and cold conduits 12, 14. Hence, sometimes a specific reversible heat pump assembly 100 may need to pump heat transfer liquid of the thermal energy circuit 10 through the corresponding heat pump 110 and sometimes the reversible heat pump assembly 100 may need to let heat transfer liquid of the thermal energy circuit 10 to flow through the corresponding heat pump 110. Accordingly, it will be possible to let all the pumping within the district thermal energy distribution system 1 to take place in the reversible heat pump assemblies 100. Hence, an easy to build district thermal energy distribution system 1 is provided. Further a district thermal energy distribution system 1 that is easy to control is provided. Moreover, due to the limited flows and pressures needed the pump assemblies of the flow controllers 101 may be based on frequency controlled circulation pumps.

The person skilled in the art realizes that the present invention by no means is limited to the preferred embodiments described above. On the contrary, many modifications and variations are possible within the scope of the appended claims.

For example, in the above discussed embodiments the flow mode controller 108b and the heat pump assembly mode controller 108a are discussed as being implemented as a single device. However, the functions of the two different mode controllers 108a, 108b may be distributed on different physical devices. For example, one device (acting as the heat pump assembly mode controller 108a) may be configured to control the setting of the reversible heat pump assembly 100 in either the heating mode or the cooling mode, another device (acting as the flow mode controller 108b) may be configured to control if the flow controller 101 shall be set in the flowing mode or in the pumping mode. These two different devices may be configured to communicate with each other.

Additionally, variations to the disclosed embodiments can be understood and effected by the skilled person in practicing the claimed invention, from a study of the drawings, the disclosure, and the appended claims.

The invention claimed is:

1. A reversible heat pump assembly comprising:
a heat pump having a first side and a second side, the first side having a first side inlet and a first side outlet allowing heat transfer liquid to flow through the first side of the heat pump, the second side having a second side inlet and a second side outlet allowing heat transfer liquid to flow through the second side of the heat pump, the heat pump being configured to transfer heat from the first side to the second side or vice versa;
a first side inlet valve assembly comprising:
  a heat pump connection to the first side inlet;
  a hot conduit connection connectable to a hot conduit of a thermal energy grid, the hot conduit being configured to allow heat transfer liquid of a first temperature to flow therethrough; and
  a cold conduit connection connectable to a cold conduit of the thermal energy grid, the cold conduit being configured to allow heat transfer liquid of a second temperature to flow therethrough, the second temperature being lower than the first temperature; and
a second side outlet valve assembly comprising:
  a heat pump connection to the second side outlet;
  a heating circuit connection connectable to a heating circuit being configured to allow heat transfer liquid to flow therethrough; and
  a cooling circuit connection connectable to a cooling circuit being configured to allow heat transfer liquid to flow therethrough;
a second side inlet valve assembly comprising:
  a heat pump connection to the second side inlet,
  a heating circuit connection connectable to the heating circuit; and
  a cooling circuit connection connectable to the cooling circuit; and
a heat pump assembly mode controller configured to selectively set the reversible heat pump assembly in either a heating mode or a cooling mode,
wherein in the heating mode, the heat pump assembly mode controller is configured to set:
  the heat pump to transfer heat from the first side to the second side;
  the first side inlet valve assembly to fluidly connect the hot conduit connection and the heat pump connection;
  the second side outlet valve assembly to fluidly connect the heat pump connection and the heating circuit connection; and
  the second side inlet valve assembly to fluidly connect the heat pump connection and the heating circuit connection;
wherein in the cooling mode, the heat pump assembly mode controller is configured to set:
  the heat pump to transfer heat from the second side to the first side;
  the first side inlet valve assembly to fluidly connect the cold conduit connection and the heat pump connection;
  the second side outlet valve assembly to fluidly connect the heat pump connection and the cooling circuit connection; and
  the second side inlet valve assembly to fluidly connect the heat pump connection and the cooling circuit connection;
wherein the second side outlet valve assembly comprises a plurality of heating circuit connections each connectable to one of a plurality of heating circuits each heating circuit being configured to allow heat transfer liquid to flow therethrough; and
wherein in the heating mode, the heat pump assembly mode controller is configured to set the second side outlet valve assembly to fluidly connect the heat pump connection and one of the heating circuit connections, thereby to set which one of the plurality of heating circuits to be provided with heating from the heat pump assembly.

2. The reversible heat pump assembly according to claim 1, wherein the heat pump assembly mode controller is configured to set the second side outlet valve assembly to fluidly connect the heat pump connection and one of the heating circuit connections at a first point in time and to set the second side outlet valve assembly to fluidly connect the heat pump connection and another one of the heating circuit connections at a second point in time, the second point in time being different from the first point in time.

3. The reversible heat pump assembly according to claim 1,
wherein the second side outlet valve assembly comprises a plurality of cooling circuit connections each connectable to one of a plurality of cooling circuits each cooling circuit being configured to allow heat transfer liquid to flow therethrough; and
wherein in the cooling mode, the heat pump assembly mode controller is configured to set the second side outlet valve assembly to fluidly connect the heat pump connection and one of the cooling circuit connections, thereby to set which one of the plurality of cooling circuits to be provided with cooling from the heat pump assembly.

4. The reversible heat pump assembly according to claim 3, wherein the heat pump assembly mode controller is configured to set the second side outlet valve assembly to fluidly connect the heat pump connection and one of the cooling circuit connections at a first point in time and to set the second side outlet valve assembly to fluidly connect the heat pump connection and another one of the cooling circuit connections at a second point in time, the second point in time being different from the first point in time.

5. The reversible heat pump assembly according to claim 1,
wherein the heat pump assembly mode controller is configured to receive demand signals from the plurality of heating circuits and/or the plurality of cooling circuits; and
wherein the heat pump assembly mode controller is configured to prioritize the demands differently.

6. The reversible heat pump assembly according to claim 1,
wherein in the heating mode, the heat pump assembly mode controller is configured to set:
  the first side inlet valve assembly to fluidly disconnect the cold conduit connection from the heat pump connection; and the second side outlet valve assembly to fluidly disconnect the heat pump connection from the cooling circuit connection; and wherein in the cooling mode, the heat pump assembly mode controller is configured to set:

the first side inlet valve assembly to fluidly disconnect the hot conduit connection from the heat pump connection; and the second side outlet valve assembly is configured to fluidly disconnect the heat pump connections from the heating circuit connection.

7. The reversible heat pump assembly according to claim 1, wherein the heat pump is a reversible heat pump comprising a first side coil, a second side coil and a reversing valve, wherein upon the heat pump assembly is set in the heating mode:

the first side coil is configured to work as an evaporator, the second side coil is configured to work as a condenser, and the reversing valve is set such that refrigerant of the heat pump is flowing from the first side coil to the second side coil; and wherein upon the heat pump assembly is set in the cooling mode:

the second side coil is configured to work as an evaporator, the first side coil is configured to work as a condenser, and the reversing valve is set such that refrigerant of the heat pump is flowing from the second side coil to the first side coil.

8. A district thermal energy distribution system comprising:

a thermal energy grid comprising:

a hot conduit configured to allow heat transfer liquid of a first temperature to flow therethrough, and a cold conduit configured to allow heat transfer liquid of a second temperature to flow therethrough, the second temperature being lower than the first temperature; and a plurality of reversible heat pump assemblies according to claim 1, wherein the plurality of reversible heat pump assemblies is connected to the thermal energy grid.

9. A reversible heat pump assembly comprising:

a heat pump having a first side and a second side, the first side having a first side inlet and a first side outlet allowing heat transfer liquid to flow through the first side of the heat pump, the second side having a second side inlet and a second side outlet allowing heat transfer liquid to flow through the second side of the heat pump, the heat pump being configured to transfer heat from the first side to the second side or vice versa;

a first side inlet valve assembly comprising:

a heat pump connection to the first side inlet;

a hot conduit connection connectable to a hot conduit of a thermal energy grid, the hot conduit being configured to allow heat transfer liquid of a first temperature to flow therethrough; and a cold conduit connection connectable to a cold conduit of the thermal energy grid, the cold conduit being configured to allow heat transfer liquid of a second temperature to flow therethrough, the second temperature being lower than the first temperature; and a second side outlet valve assembly comprising:

a heat pump connection to the second side outlet;

a heating circuit connection connectable to a heating circuit being configured to allow heat transfer liquid to flow therethrough; and a cooling circuit connection connectable to a cooling circuit being configured to allow heat transfer liquid to flow therethrough; and a heat pump assembly mode controller configured to selectively set the reversible heat pump assembly in either a heating mode or a cooling mode, wherein in the heating mode, the heat pump assembly mode controller is configured to set:

the heat pump to transfer heat from the first side to the second side;

the first side inlet valve assembly to fluidly connect the hot conduit connection and the heat pump connection; and the second side outlet valve assembly to fluidly connect the heat pump connection and the heating circuit connection;

wherein in the cooling mode, the heat pump assembly mode controller is configured to set:

the heat pump to transfer heat from the second side to the first side;

the first side inlet valve assembly to fluidly connect the cold conduit connection and the heat pump connection;

the second side outlet valve assembly to fluidly connect the heat pump connection and the cooling circuit connection;

wherein the second side outlet valve assembly comprises a plurality of heating circuit connections each connectable to one of a plurality of heating circuits each heating circuit being configured to allow heat transfer liquid to flow therethrough; and wherein in the heating mode, the heat pump assembly mode controller is configured to set the second side outlet valve assembly to fluidly connect the heat pump connection and one of the heating circuit connections, thereby to set which one of the plurality of heating circuits to be provided with heating from the heat pump assembly;

the reversible heat pump assembly further comprising:

a pressure difference determining device adapted to determine a local pressure difference, $\Delta p$, between heat transfer liquid of the hot and the cold conduits;

a flow controller connected in between the first side inlet of the heat pump and the first side inlet valve assembly, wherein the flow controller is configured to be selectively set in either a pumping mode or in a flowing mode, wherein upon set in the pumping mode the flow controller is configured to act as a pump for pumping heat transfer liquid from the thermal energy grid into the first side inlet of the heat pump, and wherein upon set in flowing mode the flow controller is configured to act as a flow regulator for allowing heat transfer liquid from the thermal energy grid to flow into the first side inlet of the heat pump; and a flow mode controller configured to, based on the local pressure difference, selectively control the flow controller to be set in the pumping mode or in the flowing mode.

10. The reversible heat pump assembly according to claim 9, wherein the flow mode controller is further configured to base the setting of the flow controller in the pumping mode or the flowing mode on if the reversible heat pump assembly is set either in the heating mode or in the cooling mode.

11. A reversible heat pump assembly comprising:
a heat pump having a first side and a second side, the first side having a first side inlet and a first side outlet allowing heat transfer liquid to flow through the first side of the heat pump, the second side having a second side inlet and a second side outlet allowing heat transfer liquid to flow through the second side of the heat pump, the heat pump being configured to transfer heat from the first side to the second side or vice versa;
a first side inlet valve assembly comprising:
a heat pump connection to the first side inlet;
a hot conduit connection connectable to a hot conduit of a thermal energy grid, the hot conduit being configured to allow heat transfer liquid of a first temperature to flow therethrough; and
a cold conduit connection connectable to a cold conduit of the thermal energy grid, the cold conduit being configured to allow heat transfer liquid of a second temperature to flow therethrough, the second temperature being lower than the first temperature; and
a second side outlet valve assembly comprising:
a heat pump connection to the second side outlet;
a heating circuit connection connectable to a heating circuit being configured to allow heat transfer liquid to flow therethrough; and
a cooling circuit connection connectable to a cooling circuit being configured to allow heat transfer liquid to flow therethrough; and
a heat pump assembly mode controller configured to selectively set the reversible heat pump assembly in either a heating mode or a cooling mode,
wherein in the heating mode, the heat pump assembly mode controller is configured to set:
the heat pump to transfer heat from the first side to the second side;
the first side inlet valve assembly to fluidly connect the hot conduit connection and the heat pump connection; and
the second side outlet valve assembly to fluidly connect the heat pump connection and the heating circuit connection;
wherein in the cooling mode, the heat pump assembly mode controller is configured to set:
the heat pump to transfer heat from the second side to the first side;
the first side inlet valve assembly to fluidly connect the cold conduit connection and the heat pump connection;
the second side outlet valve assembly to fluidly connect the heat pump connection and the cooling circuit connection;
wherein the second side outlet valve assembly comprises a plurality of heating circuit connections each connectable to one of a plurality of heating circuits each heating circuit being configured to allow heat transfer liquid to flow therethrough; and
wherein in the heating mode, the heat pump assembly mode controller is configured to set the second side outlet valve assembly to fluidly connect the heat pump connection and one of the heating circuit connections, thereby to set which one of the plurality of heating circuits to be provided with heating from the heat pump assembly;
the reversible heat pump assembly further comprising:
a pressure difference determining device adapted to determine a local pressure difference, $\Delta p$, between heat transfer liquid of the hot and the cold conduits;
a flow regulator connected in between the first side inlet of the heat pump and the first side inlet valve assembly, wherein the flow regulator is configured to allow heat transfer liquid from the thermal energy grid to flow into the first side inlet of the heat pump;
a pump connected in between the first side inlet of the heat pump and the first side inlet valve assembly, wherein the pump is configured to pump heat transfer liquid from the thermal energy grid into the first side inlet of the heat pump; and
a flow mode controller configured to, based on the local pressure difference, selectively activate either the flow regulator or the pump for transferring heat transfer liquid from the thermal energy grid into the first side inlet of the heat pump.

12. The reversible heat pump assembly according to claim 11, wherein the flow mode controller is further configured to base the activation of either the flow regulator or the pump for transferring heat transfer liquid from the thermal energy grid into the first side inlet of the heat pump on if the reversible heat pump assembly is set either in the heating mode or in the cooling mode.

* * * * *